United States Patent
Savin

(10) Patent No.: US 7,304,100 B2
(45) Date of Patent: Dec. 4, 2007

(54) PROCESS FOR MANUFACTURING A LATEX COMPOSITION

(75) Inventor: Ronald R. Savin, Rancho Mirage, CA (US)

(73) Assignee: Hyperseal, Inc., Rancho Mirage, CA (US)

( * ) Notice: Subject to any disclaimer, the term of this patent is extended or adjusted under 35 U.S.C. 154(b) by 0 days.

(21) Appl. No.: 10/946,356

(22) Filed: Sep. 22, 2004

(65) Prior Publication Data

US 2006/0063860 A1   Mar. 23, 2006

(51) Int. Cl.
*C08J 9/32* (2006.01)
*C08L 1/04* (2006.01)

(52) U.S. Cl. .................. 523/218; 523/219; 524/35

(58) Field of Classification Search ............... 523/218, 523/219

See application file for complete search history.

(56) References Cited

U.S. PATENT DOCUMENTS

| 4,904,709 | A | * | 2/1990 | Hermele | 523/220 |
| 5,252,632 | A | * | 10/1993 | Savin | 523/137 |
| 6,214,450 | B1 | * | 4/2001 | Wickert et al. | 428/220 |
| 6,644,405 | B2 | * | 11/2003 | Vijn et al. | 166/293 |
| 2006/0000155 | A1 | * | 1/2006 | Wagner | 52/22 |

* cited by examiner

*Primary Examiner*—Tae H Yoon
(74) *Attorney, Agent, or Firm*—Ladas and Parry LLP

(57) ABSTRACT

The present invention provides a process for manufacturing a latex coating composition wherein the process comprises a) mixing water with a thickener in a high shear mixing zone to produce a gelled solution and b) mixing said gelled solution with a latex and glass bubbles to produce a latex coating composition. The latex coating compositions exhibit improved waterproofing characteristics and significantly reduce the temperature increase due to solar rays when applied to industrial or architectural surfaces.

14 Claims, No Drawings

PROCESS FOR MANUFACTURING A LATEX COMPOSITION

The present invention relates to a process for manufacturing an improved latex coating composition.

Industrial and architectural coatings reduce the surface temperature of patio and roofing surfaces. However the quality of heat reduction over such surfaces is only marginally effective. In particular flat roof coatings have a tendency to peel or delaminate when rainfall causes puddles which is known as "ponding".

Consequently in order to be effective against the buildup of heat on such surfaces the coating must be extremely resistant to rain and snow and should be relatively easy to clean when required.

Lightweight high strength glass bubbles have been used as a resin extender for industrial products used in the automotive, aerospace and construction industries. However it has now been found that the addition of a high concentration of glass bubbles to an industrial or architectural latex of low density produces a coating composition that is highly water resistant and prevents the build up of heat due to solar rays when applied to a surface.

Accordingly the present invention provides an improved latex coating composition comprising between 5-50% by volume of glass bubbles uniformly distributed throughout the composition, 0.5-10% by weight of a thickener and a latex wherein said composition has a density of between 0.5 and 1.5 g/cm$^3$, preferably between 0.8-1.1 g/cm$^3$.

The glass bubbles may remain indefinitely and they do not exhibit a tendency to float to the surface of the composition which is an irreversible process and renders the composition unusable.

Furthermore the present invention also provides a process for manufacturing a latex composition wherein the process comprises:

a) mixing water with a thickener in a high shear mixing zone to produce a gelled solution and b) mixing said gelled solution with a latex and glass bubbles to the latex to produce a latex coating composition.

The thickener may be any suitable water soluble thickener. The thickener is preferably a cellulosic additive such as a cellulose ether or a hydrocellulose. In a preferred embodiment of the invention the thickener is a hydroxyethylcellulose and is advantageously selected from the Natrosol product line as manufactured by Hercules Inc e.g. Natrosol 250MR.

Typically between 0.5-10% by weight of the thickener is added to the water, preferably between 1-5% by weight and most preferably between 2-4% by weight e.g. 3% by weight The high shear mixing zone may comprise any device suitable for producing intensive mixing and turbulent agitation. The high shear mixing zone may be tank reactor comprising high pressure injection nozzles, blades or propellers, a continuous stirred tank reactor (CSTR), a cowls dissolver or a centrifuge. Wherein blades or propellors are employed typically the high shear mixing zone is operated at above 500, suitably above 1000 and advantageously at above 1500 revolutions per minute (RPM).

Usually the mixing is conducted at room temperature.

The gelled solution usually has a Brookfield viscosity at 25° C. of between 10-1000 mPa, preferably between 50-5000 mPa and most preferably between 100-1000 mPa.

The gelled solution is then mixed with the latex and the glass bubbles. The glass bubbles may be added to the gelled solution with the subsequent addition of the latex. Preferably the latex and the glass bubbles are simultaneously mixed with the gelled solution.

Usually the volume ratio of the gelled solution to latex is between 1:5 to 1.1.

The latex is a stable aqueous dispersion of any suitable water-insoluble polymer. The polymer may be a homopolymer or a copolymers. Suitable polymers include polyvinylacetates, polyacrylates, polyurethanes, acrylic acid polymers and polyvinylchorides. Preferably the latex is selected from an acrylic latex, an acrylic-styrene latex, a vinylacrylic latex and a vinylacrylic-acetate latex. Most preferably the latex is an acrylic latex and is advantageously 6183D an acrylic latex manufactured by BASF.

The latex usually has a density of between 0.8-1.5 g/cm$^3$, preferably between 0.9-1.2 g/cm$^3$ and advantageously between 1.0-1.1 g/cm$^3$.

The glass bubbles are hollow and essentially spherical in shape. The glass bubbles are light weight and chemically resistant. They possess a low density, typically between 0.1-0.6 g/cm$^3$, preferably between 0.2-0.5 g/cm$^3$ and most preferably between 0.3-0.4 g/cm$^3$. They usually have a size between 10-200 microns, preferably between 20-150 microns and advantageously between 50-100 microns.

The glass bubbles are also highly durable and possess an isotactic crush strength (90% survival) of between 250-10000 psi, usually between 500-5000 psi and typically between 1000-3000 psi.

The glass bubbles are advantageously of uniform size and shape.

The bubbles may be constructed from any suitable glass. The glass may contain silica, sodium silicate and/or calcium silicate. The glass may also contain oxides of boron, phosphorous, potassium and/or barium. In a preferred embodiment of the invention the glass bubbles are composed of sodium boro silicate and are advantageously selected from the Scotchlite Glass Bubbles manufactured by the 3M Corporation.

Usually between 5-50%, preferably between 10-30% and advantageously between 15-25% by volume of glass bubbles based on the volume of the latex are added to produce the latex coating composition.

The resultant latex coating composition comprises glass bubbles uniformly distributed throughout the coating composition.

The present invention also provides an improved latex coating composition as manufactured by the process as herein described above and industrial or architectural surfaces coated with said latex coating composition. The latex coating composition may be advantageously applied to roofs, patios and driveways. Such surfaces are typically manufactured from concrete, tile, asphalt, metal and composites.

Color imparting additives may be added to the coating composition. Preferably when coating composition is applied to roofs the composition is tinted white. Alternatively when the composition is applied to patio surfaces the composition is advantageously tinted any light pastel color.

The coating composition may further comprise other materials such defoamers and coalescent solvents for the latex. In a preferred embodiment of the invention the coating composition comprises Texanol (an ester alcohol manufactured by Eastman) as a coalescent solvent and BYK 024 as a defoamer (manufactured by BYK Chemie).

The coated surfaces exhibit improved waterproofing characteristics and significantly reduce the temperature increase due to solar rays. The latex coating composition also protects the surfaces from rain and snow improving the effective lifespan of such surfaces commonly used for factories, schools, warehouses, office buildings and shopping centers etc. The increased resistance to an increase in temperature due to solar rays also reduces the air conditioning costs of these structures as the buildup of heat due to solar rays impacts heavily on the electricity consumed to provide comfort within these structures.

The invention will now be illustrated in the following examples.

EXAMPLE 1

Comparative Example

3% by weight of Natrosol 250MR was slowly added to the water component of an acrylic latex to form a solution.

The solution was then mixed with 5 gallons of acrylic latex with the simultaneous addition of one gallon of Scotchlite 37S glass bubbles.

EXAMPLE 2

Example According to the Invention

The above process was repeated wherein Natrosol 250MR was mixed with the water component of the acrylic latex in a high speed blender operating in excess of 1000 revolutions per minute (RPM) until the viscosity of the solution virtually gelled to a vasoline like consistency.

The gelled solution was then mixed with 5 gallons of acrylic latex with the simultaneous addition of one gallon of Scotchlite 37S glass bubbles.

The two compositions were sealed for seven days. Upon opening Example 1 it was observed that the glass bubbles had floated to the surface of the composition whereas the glass bubbles in Example 2 remained uniformly distributed throughout the composition.

Example 2 was stored for a further six months with no change in either viscosity nor the uniform distribution of the gas bubbles was observed i.e. no glass bubbles floated to the surface.

EXAMPLE 3

Water Resistance

In order to determine the water resistance of the latex coating composition according to the invention three sides of a 30 ft×15 ft swimming pool were coated with Example 2. The remaining side was coated with a conventional acrylic latex. After the coatings had dried the swimming pool was filled with water.

It was observed that the sides coated with the composition according to the present invention remained bright and demonstrated no blistering or peeling for six months whilst the side coated with same formulation without the inclusion of glass bubbles began to blistered peeled and failed within two weeks.

EXAMPLE 4

Heat Reduction

In order to determine the quality of conventional asphaltic sheet roofing and the heat reduction over roofing surfaces coated with the coating according to the invention were evaluated. The ceiling below an asphlatic sheeting was protected with 12 inches of insulation. Two coats of Example 2 were applied to approximately 300 ft$^2$ leaving 100 ft$^2$ uncoated.

The ambient outside temperature was 107° F. Maximum temperature was reached at approximately 3.00 p.m due to solar heat buildup after cooling to near ambient temperature prior to sunrise. The temperature of the uncoated roof exhibited a temperature of 150° F. whilst the coated area exhibited a temperature of 115° F.

The improved latex coating composition was also tested upon the patio area of the swimming pool. An area of the patio was coated with Example 2 adjacent concrete that had a temperature of 145° F. making it very painful to walk on this area without shoes. The coated area had fallen to a temperature below 120° F.

It can be seen that patio surface provided coated with the improved latex coating composition provided excellent insulation and solar reflection and became comfortable to walk on for bare feet.

The composition of typical roof-deck composition according to the present invention is provided below.

EXAMPLE 5

| Raw Materials | Weight (lbs) | Volume (gallons) |
| --- | --- | --- |
| 6183 D | 400 | 48 |
| Propylene glycol | 12 | 1.2 |
| Texanol | 4 | 0.5 |
| Zinc Oxide (Azo 77) | 40 | 1 |
| Titanium dioxide | 200 | 6 |
| H$_2$O 3% 250 MR | 200 | 24 |
| 37S Glass Bubbles | 57 | 19 |
| ByK 024 | 5 | 0.6 |

The invention claimed is:

1. A process for manufacturing a latex coating composition having hollow glass bubbles having a density of between 0.2-0.5 g/cm$^2$ uniformly distributed throughout the composition wherein the process comprises:
   a) mixing a cellulosic thickener with water to produce a solution containing 1-5% by weight of cellulosic thickener in a high shear mixing zone to produce a gelled solution with a consistency such that when mixed with a latex and the glass bubbles in respective amounts is effective to form the composition having glass bubbles suspended in the composition without floating to the surface of the composition and
   b) mixing said gelled solution with the latex and glass bubbles to produce the latex coating composition with the glass bubbles uniformly distributed throughout the composition.

2. A process according to claim 1, wherein the thickener is water soluble.

3. A process according to claim 1, wherein the cellulosic thickner is hydroxyethylcellulose.

4. A process according to claim 1, wherein the latex is a stable aqueous dispersion of polymer and wherein the polymer is selected from the group consisting of polyvinylacetates, polyacrylates, polyurethanes, acrylic acid polymers and polyvinylchorides.

5. A process according to claim 4, wherein the latex is an acrylic latex.

6. A process according to claim 1, wherein the glass bubbles have a size between 10-200 microns.

7. A process according to claim 1, wherein the glass bubbles are composed of sodium boro silicate.

8. A process according to claim 1, wherein between 5-50% by volume of glass bubbles based on the volume of the latex are added in step (b).

9. A process according to claim 1 wherein the manufactured composition has a density of between 0.5-1.5 g/cm$^3$.

10. A process for manufacturing a latex coating composition having hollow glass bubbles having a density of between 0.2-0.5 g/cm$^2$ uniformly distributed throughout the composition wherein the process comprises:
   a) mixing water with a cellulosic thickener with water to produce a composition comprising between 2-4 by weight of cellulosic thickener in a high shear mixing zone to produce a gelled solution with a consistency such that when mixed with a latex and the glass bubbles in respective amounts is effective to form the composition having glass bubbles suspended in the composition without floating to the surface of the composition and
   b) mixing said gelled solution with the latex and glass bubbles to produce the latex coating composition with the glass bubbles uniformly distributed throughout the composition.

11. A process according to claim 10 wherein the water is mixed with 3% by weight of the thickener.

12. A process according to claim 1 wherein the glass bubble have a density between 0.3-0.4 g/cm3.

13. A process for manufacturing a latex coating composition having hollow glass bubbles having a density of between 0.2-0.5 g/cm$^2$ uniformly distributed throughout the composition wherein the process comprises:
   a) mixing water with a cellulosic thickener with water to produce a composition comprising between 1-5% by weight of cellulosic thickener in a high shear mixing zone to produce a gelled solution with the consistency of vaseline to form the composition having glass bubbles suspended in the composition without floating to the surface of the composition and
   b) mixing said gelled solution with the latex and glass bubbles to produce the latex coating composition with the glass bubbles uniformly distributed throughout the composition.

14. A process for manufacturing a latex coating composition having hollow glass bubbles having a density of between 0.2-0.5 g/cm$^2$ uniformly distributed throughout the composition wherein the process comprises:
   a) mixing water with a cellulosic thickener with water to produce a composition comprising between 1-4 by weight of cellulosic thickener in a high shear mixing zone to produce a gelled solution with a consistency such that when mixed with a latex and the glass bubbles in respective amounts is effective to form the composition having glass bubbles suspended in the composition without floating to the surface of the composition and
   b) mixing said gelled solution with the latex and glass bubbles to produce the latex coating composition with the glass bubbles uniformly distributed throughout the composition.

* * * * *

UNITED STATES PATENT AND TRADEMARK OFFICE
CERTIFICATE OF CORRECTION

PATENT NO. : 7,304,100 B2 Page 1 of 1
APPLICATION NO. : 10/946356
DATED : December 4, 2007
INVENTOR(S) : Ronald R. Savin It is certified that error appears in the above-identified patent and that said Letters Patent is hereby corrected as shown below:

On title page, item 22, "22" should read -- 20 --.

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,304,100 B2 | Page 1 of 1 |
| APPLICATION NO. | : 10/946356 | |
| DATED | : December 4, 2007 | |
| INVENTOR(S) | : Ronald Savin | |

It is certified that error appears in the above-identified patent and that said Letters Patent is hereby corrected as shown below:

On the title page, item [73] should be deleted.

The assignee was entered as "Hyperseal, Inc."

There is no assignee recorded in the application or patent.

Signed and Sealed this
Fourteenth Day of February, 2012

David J. Kappos
*Director of the United States Patent and Trademark Office*